Oct. 22, 1929.  J. L. DOUGHERTY  1,732,743
PROCESS FOR CUTTING LOGS
Filed Aug. 4, 1927
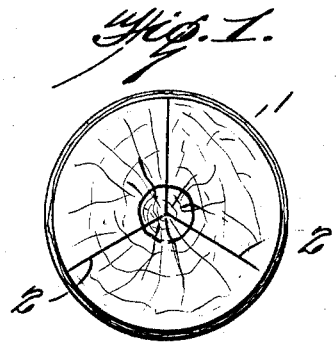
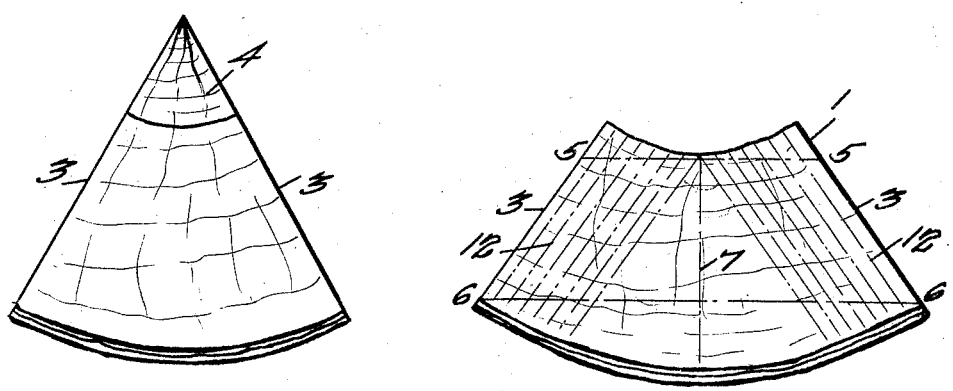
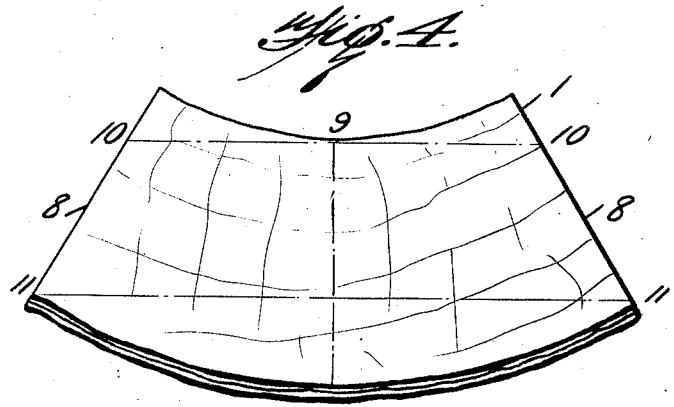
INVENTOR.
J. L. DOUGHERTY
BY
F. P. Lorin
ATTORNEY.

Patented Oct. 22, 1929

1,732,743

UNITED STATES PATENT OFFICE

JAMES L. DOUGHERTY, OF SEATTLE, WASHINGTON

PROCESS FOR CUTTING LOGS

Application filed August 4, 1927. Serial No. 210,633.

This invention relates to an improved process for determining the board measure contents of a log cant and for cutting the same to obtain the maximum board measure therefrom.

In many logs as delivered to the mill, particularly cedar logs, the center or heart of the log, in varying proportions in different logs, is almost without exception decayed or at least so discolored as to be of no value for cutting into board lengths.

In carrying out the process, the log is split by wedges or in any other appropriate manner to provide cants, the outer surfaces of which are the surface of the original log and the side edges of which are radial of the original log along the line of split. The heart or discolored portion is then split off and the bolt or cant is of irregular face outline.

In determining the board measure of such a bolt or cant, the width is determined by measuring along the line of least width, that is, next the heart portion, and along the line of maximum width, that is, next the bark portion, and the average of these measurements, that is, one-half their sum, is taken as the average width. This dimension is multiplied by the thickness of the cant measured radially thereof in the center between the side edges, and the length is determined by an overall measurement. The product of these dimensions, average width, thickness and length, multiplied together and divided by 12, where the width and thickness is in inches and the length in feet, will give the approximate board measure.

It frequently happens that due to an unusually large discolored or decayed heart, the bolt or cant is comparatively small in thickness and of great width with the sides approaching each other on a wide angle. Under these circumstances, it is found desirable to first divide the cant by a line drawn approximately from the center of its inner margin to the center of its outer margin and using this line as a side of each of two cants, the board measure of each cant, that is, the material on each side of the line referred to, is measured in the manner above described to provide the board measurement.

The process is illustrated in the accompanying drawings, wherein:

Figure 1 represents a view of a log 1 with the lines of split by the wedges indicated at 2.

Figure 2 indicates a cant produced as a result of a split, the side edges being indicated at 3 and the heart, which by reason of being discolored or decayed must be cut away, is indicated at 4.

Figure 3 illustrates the same cant with the heart cut away. Lines 5—5 and 6—6 on Figure 3 show the means for obtaining the average width of the cant, such average width being provided by measuring the length of the distance 5—5 and the length of the distance 6—6 and dividing the sum of these distances by 2. The thickness of the cant is indicated by measurement along the line 7—7 in Figure 3.

Figure 4 shows an extreme cant in which a great deal of the heart of the log has been cut away, the side edges being indicated at 8. In this instance, a division line 9—9 is drawn on the face of the cant dividing the same into two equal portions as nearly as may be. Each division is then measured for board measurements, the average width being obtained by one-half the sum of the measurements along the lines 10—10 and 11—11 of each cant division, the thickness being that of each cant section and the length of course obtained in an obvious manner.

In cutting these cants to secure the maximum board measurement, it is found that if the saw operates on lines parallel to the sides of the cant, as shown on lines 12 in Figure 3 a greater board content is obtainable from a particular cant than would otherwise be the case.

Of course, it will be understood that the cant is first cut parallel to one side edge until the saw reaches the vertical center of the cant, when the cant is turned and sawed parallel to the other side edge. This may be continued until the material is used, the wedge forming at the center of the cant after the full width boards have been cut therefrom constituting in effect a smaller cant which may be cut in the same manner but which of course will produce boards of less width.

The invention is designed to provide a means for readily and accurately determining the board measurement of a bolt or cant and a cutting of such cant or bolt to produce the maximum board measure.

While particularly useful in connection with the cutting of cedar logs, it is obviously no less important with logs of other woods and this whether the cants have been produced by splitting, sawing or in any other manner. The necessity of producing cants of this type is particularly important in connection with cedar logs as in practically every instance the heart portion of such logs is found so discolored or decayed that if the boards were cut therefrom in the usual manner, considerable material would be wasted in that the boards throughout the width of the heart portion would be very narrow and would have to be further handled to cut away the decayed or discolored portion.

What is claimed to be new is:

A process of sawing logs, consisting in splitting the log into three cants, removing the heart section of the log which has become the apex of the cants, the top of the cant being cut substantially on a circle concentric with the outer curve of the log, and sawing from each side of the cant parallel to the respective side until the saw reaches the vertical center line of the cant, thereby obtaining the majority of the boards of the same width.

In testimony whereof I affix my signature.

JAMES L. DOUGHERTY.